Figure 1:
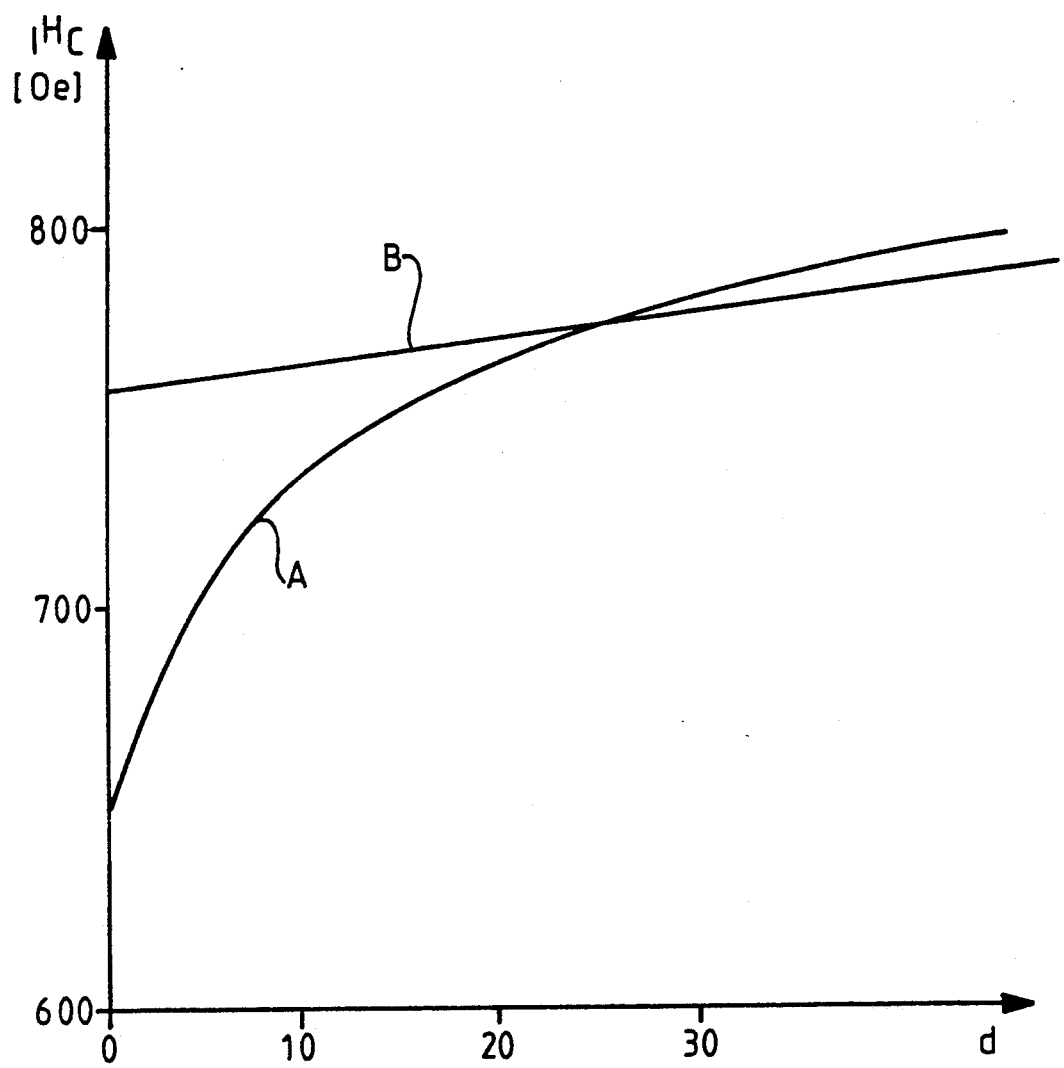

United States Patent [19]
Buxbaum et al.

[11] Patent Number: 5,028,269
[45] Date of Patent: Jul. 2, 1991

[54] CO-CONTAINING MAGNETIC PIGMENTS, PROCESSES FOR THE PRODUCTION THEREOF AND THE USE THEREOF

[75] Inventors: Gunter Buxbaum; Jürgen Wiese; Peter Kiemle, all of Krefeld; Aloys Eiling, Bochum, all of Fed. Rep. of Germany

[73] Assignee: Bayer Aktiengesellschaft, Leverkusen-Bayerwerk, Fed. Rep. of Germany

[21] Appl. No.: 488,933

[22] Filed: Mar. 5, 1990

[30] Foreign Application Priority Data

Mar. 15, 1989 [DE] Fed. Rep. of Germany ....... 3908427

[51] Int. Cl.$^5$ .............................................. C04B 14/00
[52] U.S. Cl. .................................... 106/480; 106/459; 428/900; 428/694
[58] Field of Search ............... 106/456, 459, 480; 428/692, 694, 900

[56] References Cited

U.S. PATENT DOCUMENTS 3,931,025  1/1976  Woditsch .................... 252/62.62
4,933,014  6/1990  Kathrein ...................... 106/459

Primary Examiner—William R. Dixon, Jr.
Assistant Examiner—Chris Gallo
Attorney, Agent, or Firm—Connolly & Hutz

[57] ABSTRACT

Acicular magnetic iron oxide pigments are disclosed which have a Co content of 1 to 5% by weight and an FeO content of 5 to 12% by weight. The pigments may optionally contain an additional dopant selected from zinc, phosphate and $SiO_2$. The pigments are useful in magnetic recording media such as video tapes.

5 Claims, 1 Drawing Sheet

CO-CONTAINING MAGNETIC PIGMENTS, PROCESSES FOR THE PRODUCTION THEREOF AND THE USE THEREOF

This invention relates to acicular magnetic iron oxide pigments having a Co content of from 1 to 5%, by weight, and a FeO content of from 5 to 12%, by weight, to processes for the production thereof and to the use thereof.

Co-containing magnetic pigments are widely used in signal recording, particularly in the production of video tapes.

Since cobalt is an expensive additive, there has been no lack of attempts to achieve a maximum recording density on the basis of a correspondingly high coercive force using as little cobalt as possible. The highest coercive forces ($_iH_c$) are achieved with cobalt-doped ferrite pigments according to EP-B 100 264, but these pigments have the disadvantage of an inadequate shelf-life. These pigments have FeO contents of from 16 to 24%, by weight. However, as mentioned therein, such pigments exhibit an undesirable increase in $_iH_c$ during storage after production, which leads to a change in the magnetic recording properties of the magnetic tape. This increase is shown as a function of time in FIG. 1,A.

As described in IEEE Trans. Magn., Vol. MAG 21, pages 1497-99 (1985), FeO-containing magnetic iron oxides exhibit a decrease in coercive force during storage in a magnetic field transverse to the tape direction. To carry out this test, the samples are exposed to a magnetic field of 318 kA/m (4 kOe) at a temperature of 30° C. for 8 or 30 days, and the decrease in coercive force is measured. To avoid these disadvantageous properties, Co-coated pigments are recommended, but they require expensive production conditions and, in order to achieve the required $_iH_c$, substantially larger amounts of Co.

It is true that Co-doped $\gamma$-$Fe_2O_3$ pigments are stable under the above conditions. However, the known decrease in the residual induction when subjected to gentle heating prevents them from being used. Furthermore, with the same Co contents, they have substantially lower $_iH_c$ values than co-containing magnetite pigments.

It is an object of the present invention to provide co-containing magnetic iron oxides which do not have such disadvantages.

Surprisingly, it has now been found that, with an FeO content of from 5 to 12%, by weight, both a high coercive force, as in the case of high FeO contents, and sufficiently good stability $H_c(H)<10\%$) may be achieved. The present invention therefore relates to acicular magnetic iron oxide pigments having longterm stability, a Co content of from 1 to 5%, by weight, and an FeO content of from 5 to 12%, by weight, a transverse field stability better than 10% and a coercive force stability of less than 2.4 A/cm/30 days (30 Oe/30 days).

Furthermore, the pigments may advantageously be additionally doped with from 0.1 to 5%, by weight, of zinc and from 0.1 to 5% of $SiO_2$ and/or from 0.1 to 3% of phosphate.

These pigments, in finely divided form having a BET surface area of from 25 to 45 $m^2/g$, measured by the 1-point $N_2$ method, are particularly advantageously used for the production of video tapes.

The present invention also relates to a process for the production of such cobalt-doped iron oxide pigments, wherein acicular cobalt-containing iron(III) oxide hydroxide obtained from aqueous iron(II) salt solutions by precipitation and oxidation, at least partially in the presence of cobalt ions, are protected from sintering by modification with inorganic and organic compounds, and then reduced to $Fe_3O_4$ and partially reoxidized using an oxygen-containing gas to adjust the FeO content, which is characterized in that, after the FeO content has been adjusted, a heat treatment at from 600° to 800° C. under inert conditions is carried out.

Introduction of the cobalt ions may be effected in various phases of the precipitation. It is also possible, after the end of the precipitation, to precipitate the cobalt onto the FeOOH particles, but this must be effected in the precipitation suspension itself. This process is preferably used in the case of FeOOH which has been precipitated at a pH>11. In the case of production at a pH<7, it is advantageous to coprecipitate the cobalt during the $\alpha$-FeOOH precipitation. Precipitation of the cobalt is particularly preferably carried out by adding water-soluble cobalt salts of mineral acids, in particular sulphuric acid, after $\alpha$-FeOOH seeds have already formed, since a particularly narrow pigment particle size distribution is achieved in this way.

Modification with inorganic compounds for protection against sintering may be effected by simultaneous precipitation of zinc and/or $SiO_2$ or $P_2O_5$. The ions are introduced into the precipitation suspension as water-soluble compounds. Amounts of from 0.1 to 5% of the modifying substances, based on the iron oxide, are sufficient. The modifying substances may also be precipitated onto the FeOOH particles after the end of precipitation of the iron oxide hydroxide. In this case, precipitation should be effected in the precipitation suspension.

The $\alpha$-FeOOH particles obtained are separated from the precipitation suspension, washed in a conventional manner and dried and then advantageously heated at temperatures of from 600° to 800° C. This is followed by reduction to $Fe_3O_4$ using moist hydrogen at temperatures of from 300° to 500° C. After cooling of the magnetite to from 100° to 200° C., the presently required FeO content of from 5 to 12%, by weight, is adjusted by introducing a defined amount of air, which is preferably diluted with nitrogen.

The critical step of the present process is a heating step after the FeO content has been finally adjusted. During this procedure, an essentially homogeneous cobalt distribution is established in the pigment and an apparently specific structural stabilization of the pigment, which is responsible for the high coercive forces according to the present invention.

Heating is preferably carried out under an atmosphere of $Co_2$ and/or $N_2$. A low oxygen content in the atmosphere, which is roughly of the magnitude of the oxygen partial pressure of $CO_2$ at the temperature used, is advantageous and does not influence the FeO content. Heating at temperatures above 600° C. increases the crystalline order of the disordered phases $Fe_3O_4$ $\gamma$-$Fe_2O_3$, eliminates lattice defects and thus improves the magnetic properties, without crystal growth taking place.

Heating may extend over a period of from a few minutes to several hours, the shorter heating times being used at higher temperatures. Heating at from 600° to 700° C. for a period of from 10 minutes to 1 hour is preferred. It is important that cooling too is carried out under an inert atmosphere.

These pigments are stable in air under ambient conditions. However, heating may also be followed by stabilization to atmospheric oxygen according to DE-A 2,625,139. Densification using ball mills or roll densifiers, which is usually carried out, may also be effected, as may one of the conventional after-treatments for improving the dispersibility in coatings.

The present invention also relates to the use of such magnetic iron oxides for the production of magnetic recording media.

The present invention is further exemplified by the following Comparative Examples and the Examples in accordance with the present invention. The coercive force and residual induction are measured using a vibrating sample magnetometer at maximum field strength of 280 kA/m (3.5 kOe). The Examples are not to be regarded as implying any restriction. Those skilled in the art will readily find further embodiments by suitable variation of, in particular, the FeOOH precursor compound. The amounts stated are based on weight.

EXAMPLES 1

Production of the Co-doped FeOOH (a)

The seed suspension is produced over 5.5 hours from 8000 kg of FeSo$_4$, 75.7 kg of ZnSO$_4$.7H$_2$O and 30.9 kg of NaH$_2$PO$_4$.2H$_2$O in 40 m$^3$ of H$_2$O sing 2000 kg of NaOH in 5 m$^3$ of H$_2$O with about 1000 m$^3$ of air/h and, after the addition of 370 kg of CoSO$_4$.7H$_2$O, pigment formation is carried out over the course of 16 hours to pH 3.5 by further addition of sodium hydroxide solution and air, and the pH is then increased by 0.2 unit after 15 minutes. At pH 7.5, 15 l of the pigment suspension are removed and, at 80° C., and emulsion of 4.55 g of a polydimethylsiloxane (obtainable under the trade name "Silikon M 100" from Bayer AG) in 73 ml of H$_2$O is added while stirring and passing in air, and stirring is continued for 15 minutes. Thereafter, a solution of 3.4 g of Na$_2$P$_2$O; in 0.2 l of H$_2$O is added dropwise and stirring is continued for 30 minutes.

(b)

The seed suspension is produced over 5.5 hours from 8000 kg of FeSo$_4$, 75.7 kg of ZnSO$_4$.7H$_2$O and 30.9 kg of NaH$_2$PO$_4$.2H$_2$O in 40 m$^3$ of H$_2$O using 2000 kg of NaOH in 5 m$^3$ of H$_2$O with about 1000 m$^3$ is H$_2$O as in Example 1a, with about 1000 m: of air/h and, after the addition of 245.5 kg of CoSO$_4$.7H$_2$O, pigment formation is carried out over the course of 16 hours to pH 3.5 by further addition of sodium hydroxide solution and air, and the pH is then increased by 0.2 unit after 15 minutes. At pH 7.5, 15 l of the pigment suspension are removed and, at 80° C., an emulsion of 4.55 g of a polydimethylsiloxane ("Silikonl M 100" from Bayer AG) in 73 ml of H$_2$O is added while stirring and passing in air, and stirring is continued for 15 minutes. Thereafter, a solution of 3.4 g of Na$_2$P$_2$O$_7$in 0.2 l of H$_2$O is added dropwise and stirring is continued for 30 minutes.

Working-up is carried out by filtration and washing with deionised water until the filtrate has a conductivity of less than 50 μS. Drying is carried out in the air at about 120° C.

EXAMPLE 2

Production of pigments according to the present invention containing from 5 to 12% of FeO.

(a)

400 g of the dried αFeOOH precursor from Example 1a are crushed to a grain size of less that 1 mm, dried in a laboratory rotary kiln at 330° C. under air, heated to 700° C. over 30 minutes and maintained at this temperature for 30 minutes. For reduction, the substance is cooled to 420° C. and, after flushing with N$_2$, is reduced using moist hydrogen over 105 minutes to give Co-doped Fe$_3$O$_4$.

Cooling to 180° C. is carried out under N$_2$ and oxidation is effected by introducing air (not more than 50 1/h) over 42 minutes to an FeO content of 9.6%, by weight. Thereafter, the pigment is heated to 500° C. under N$_2$ and maintained at this temperature for 30 minutes. Immediately after cooling under N$_2$, the magnetic data are determined.

(b)

400 g of the dried α-FeOOH precursor from Example 1b were converted into a mixed oxide pigment according to the present invention, as under Example 2a. The measured values are summarized in Table 1.

TABLE 1

| | % FeO | % Co | $_iH_c$ (kA/m) (new) | $_iH_c$ after 30 days (kA/m) | (Oe) | Δ $_iH_c$ 30 d (kA/m) | (Oe) | Δ $_iH_c$ transverse % |
|---|---|---|---|---|---|---|---|---|
| Example | | | | | | | | |
| 2a | 9,6 | 1,8 | 56,6 | 711 | 58,2 | 731 | 1,59 | +20 | 6,43 |
| 2b | 10,1 | 1,2 | 47,1 | 592 | 48,4 | 608 | 1,27 | +16 | 6,08 |
| Comparative Example | | | | | | | | |
| 1 | 0,1 | 1,8 | 34,4 | 432 | 34,5 | 433 | 0,08 | +1 | 0 |
| 2 | 22,1 | 1,8 | 52,2 | 656 | 62,2 | 781 | 9,9 | +125 | 26,8 |

COMPARATIVE EXAMPLE 1

The precursor from Example 1a was dried, heated to 700° C. and reduced at 420° C. and then cooled to 350° C. as in Example 2a. The FeO content was then reduced to 0.1% by introducing air over 120 minutes. The properties of the Co-doped γ-Fe$_2$O$_3$ are shown in Table 1.

COMPARATIVE EXAMPLE 2

The precursor from Example 12a was converted into the magnetic pigment as in Example 2a, except that the oxidation at 180° C. was carried out only to an FeO content of 22.1%. Heating was once again carried out at 500° C. This sample was measured as a function of time. Table 2 and the accompanying Figure show the variation of the coercive force with storage (curve A in FIG. 1).

TABLE 2

| Days | 0 | 2 | 6 | 10 | 16 | 24 |
|---|---|---|---|---|---|---|
| $_iH_c$ (Oe) | 656 | 680 | 720 | 740 | 749 | 770 |
| (kA/m) | 52.2 | 54.1 | 57.3 | 58.9 | 59.6 | 61.3 |

The curve may be very closely approximated by an exponential function with r²=0.998:

$$_iH_c = 657 \times d^{0.0510} \text{ (Oe)}$$

$$\text{or } _iH_c = 52.3 \times d^{0.0510} \text{ (KA/m)}$$

EXAMPLE 3

The sample from Comparative Example 2 was oxidised using air at 100° C. to 11.3% of Fe). The coercive force curve shown in Table 2 and the accompanying Figure (curve B in FIG. 1) was then obtained. Because the values change only within the accuracy of measurement, it is impossible to achieve a good fit for the curve. A fitted straight line corresponds to $_iH_c = 762 + 0.66 \times d$ (Oe) or $_iH_c = 60.6 + 0.053 \times d$ (kA/m)./

TABLE 3

| Days | 0 | 7 | 14 | 21 | 28 | 7 | 42 |
|---|---|---|---|---|---|---|---|
| $_iH_c$ (Oe) | 766 | 769 | 770 | 774 | 768 | 798 | 790 |
| (kA/m) | 61.0 | 61.2 | 61.3 | 61.6 | 61.1 | 63.5 | 62.9 |

What is claimed is:

1. A circular magnetic iron oxide pigments having a Co content of from 1 to 5%, by weight, and an FeO content of from 5 to 12%, by weight, characterized in that they have a transverse field stability of less than 10% and a coercive force stability of less than 2.4 A/cm/30 days measured at room temperature.

2. A magnetic pigment as claimed in claim 1 containing an additional dopant selected from one or more of 0.1 to 5% by weight zinc, 0.1 to 3% by weight phosphate, and 0.0 to 5% by weight $SiO_2$.

3. A magnetic pigment as claimed in claim 1 further characterized by having a specific BET surface area of from 25 to 45 m²/g.

4. A process for the production of acicular magnetic iron oxide pigments as claimed in claim 1 comprising: precipitating an acicular FeOOH precursor compound from iron salts, alkalis and oxidizing agents with the addition of Co salts; drying the precursor compound to Co-containing $\alpha$-$Fe_2O_3$ at 600° to 800° C. reducing the Co-containing $\alpha$-$FeO_3$ using moist hydrogen to Co-containing $Fe_3O_4$; partially oxidizing the Co-containing $Fe_2O_4$ using $O_2$-containing gases at a temperature below 350° C. followed by heating under inert conditions at a temperature between 400° and 800° C., wherein the partial oxidation is carried out to an FeO content of from 5 to 12% by weight in the iron oxide pigments.

5. A process for the production of magnetic acicular pigments as claimed in claim 4, comprising the further step of adding to the FeOOH precursor, before the drying stage, an additional dopant selected from one or more of 0.1 to 5% by weight zinc, 0.1 to 3% by weight phosphate, and 0.1 to 5% by weight $SiO_2$.

* * * * *

UNITED STATES PATENT AND TRADEMARK OFFICE
CERTIFICATE OF CORRECTION

PATENT NO. : 5,028,269
DATED : JULY 2, 1991
INVENTOR(S) : BUXBAUM ET AL

It is certified that error appears in the above-identified patent and that said Letters Patent is hereby corrected as shown below:

Column 5; In claim 1, line 1 delete "A circular iron oxide..." and insert: --"An acicular iron oxide...".

Signed and Sealed this

Ninth Day of February, 1993

Attest:

STEPHEN G. KUNIN

Attesting Officer

Acting Commissioner of Patents and Trademarks